3,319,774
ELEVATING CONVEYOR
Alfred C. Christensen, Chicago, Ill., assignor to Lester B. Knight & Associates, Inc., Chicago, Ill., a corporation of Illinois
Filed Oct. 5, 1965, Ser. No. 493,086
7 Claims. (Cl. 198—140)

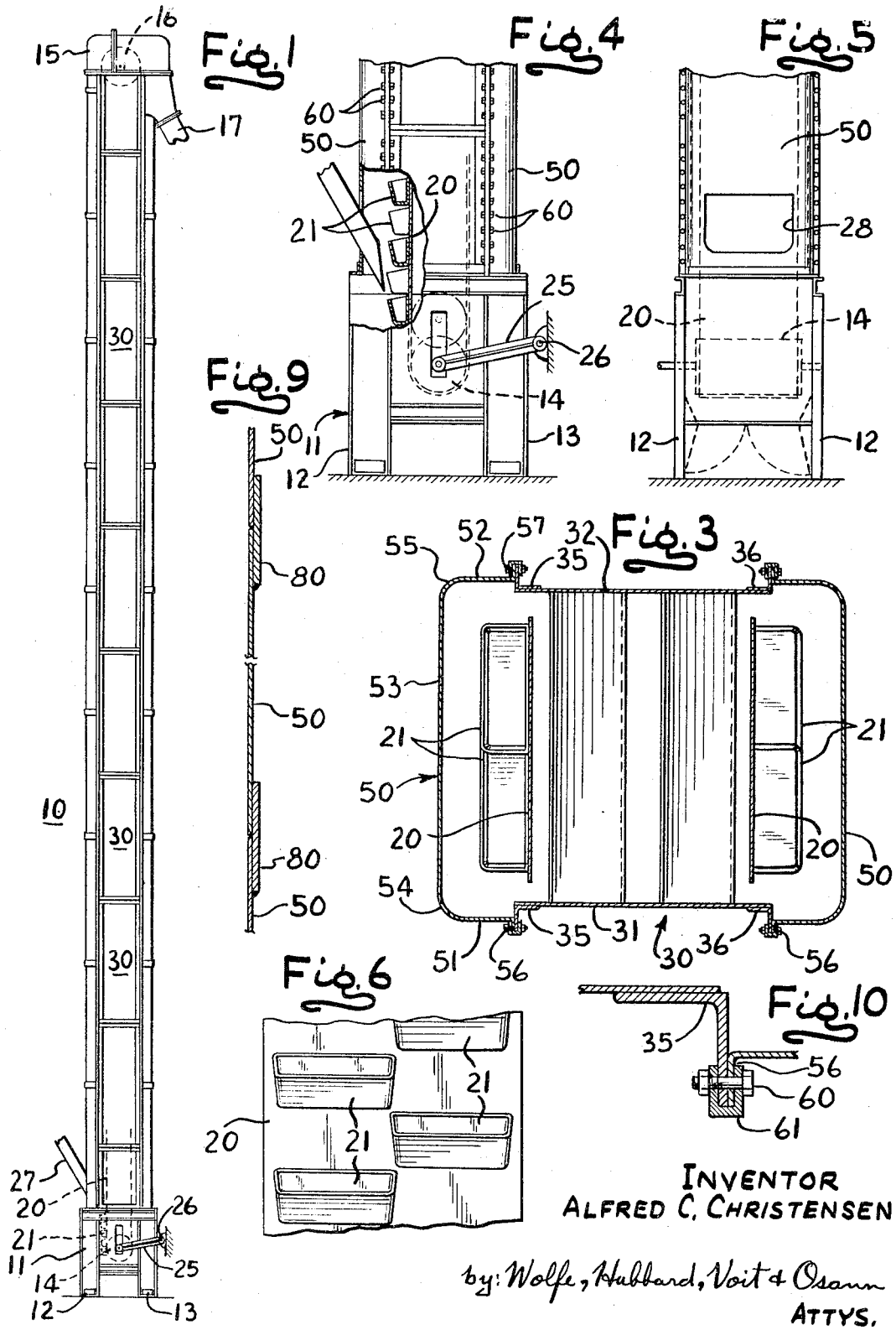

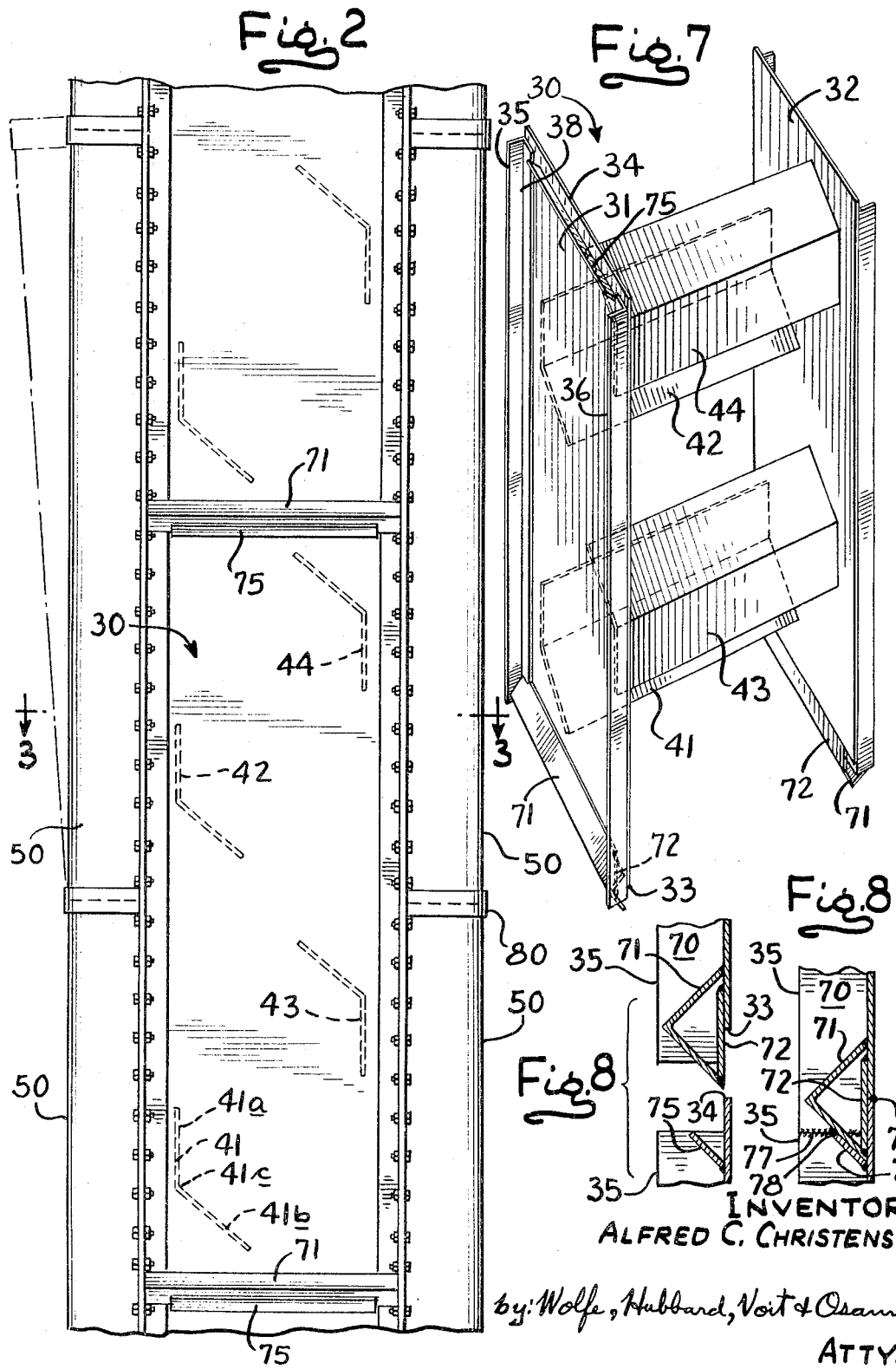

The present invention relates to conveyors of the bucket type for vertical elevation of sand or other bulk materials.

It is an object of the present invention to provide an improved elevating conveyor which is inherently strong, which may be extended to great height, which is simple and economical to construct, and which is economical to maintain, having provision for easy access for inspection, painting or repair at any region along the length thereof.

It is another object of the present invention to provide an improved conveyor for vertically conveying bulk material and which is particularly suited for use with moist sand or other materials which tend to encourage rust or corrosion.

It is related object to provide an elevating conveyor which is made up of column sections and channel-shaped covers of uniform length having novel provision for vertical stacking, with safety, to practically any desired height, limited primarily by the lifting capacity of the belt and which permits removal of any section of cover plate, or alternate sections, if desired, without loss of integrity.

It is an object of the invention in one of its aspects to provide an elevating conveyor made up of sections of uniform construction and length with novel means for nesting the sections securely and in alignment with one another thereby reducing erection time to a minimum.

Other objects and advantages of the invention will become apparent upon reading the attached detailed description and upon reference to the drawings in which:

FIG. 1 shows a typical elevating conveyor constructed in accordance with the present invention;

FIG. 2 shows a portion of the conveyor of FIG. 1 somewhat enlarged;

FIG. 3 is a typical cross section, for example, taken along the line 3—3 in FIG. 2;

FIG. 4 is a fragmentary side view of the lower end of the conveyor;

FIG. 5 is a fragmentary front view corresponding to FIG. 4;

FIG. 6 is a fragmentary face view of a portion of the conveyor belt;

FIG. 7 is a perspective view of one of the column sections;

FIG. 8 is a fragmentary section showing the means for coupling adjacent sections;

FIG. 8a shows the coupling means of FIG. 8 in the final assembled relation;

FIG. 9 shows the means for coupling adjacent covers;

FIG. 10 is a fragmentary section showing a clamping strip which may be used to secure the covers to the mating flanges.

While the invention has been described in connection with a preferred embodiment, it will be understood that I do not intend to be limited to the particular embodiment shown but intend to cover the various alternative and equivalent constructions included within the spirit and scope of the appended claims.

Turning now to the drawings and particularly to FIGS. 1–5, there is shown an elevating conveyor 10 made up of a plurality of stacked sections supported on a base 11 having legs 12, 13 and mounting a pulley 14. At the upper end of the conveyor is a head assembly 15 mounting a pulley 16 and an associated discharge chute 17. Trained about the pulleys 14, 16 is a conveyor belt 20 having a plurality of buckets 21. For the purpose of keeping the conveyor belt taut, the lower pulley 14 is preferably weighted, for example, by making it of solid steel, and mounted for floating movement. For the purpose of guiding the movement of the lower pulley along a vertical path of movement, the pulley is mounted on a pair of radius arms 25, one at each end of the pulley, and which are mounted for rocking movement about a stationary pivot axis 26. A loading chute 27 extends through an opening 28 in the side of the conveyor into proximity with the lips of the buckets 21. Suitable means are provided for driving the conveyor belt by rotation of either or both of the pulleys 14, 16. The belt is driven at a sufficient rate of speed so that the sand or other material is ejected from the buckets at the top of the conveyor by centrifugal force through the discharge chute 17.

In accordance with the present invention the conveyor is made up of a plurality of column sections of uniform length, each section including a pair of rectangular side plates rigidly joined together with their lateral edges in continuous alignment and engaged by channel-shaped covers with means for detachably securing the covers to the edges of the plates for enclosing the buckets while providing for easy access to the interior of any of the column sections. As shown in the drawings, and as particularly brought out in FIG. 7, each of the column sections, indicated at 30, includes a pair of rectangular side plates 31, 32. The side plate 31, which can be taken as representative, has a lower edge 33, an upper edge 34, and lateral edges reinforced by angle members as indicated at 35, 36. For the purpose of completing and rigidifying the column sections, each section has a plurality of spacer plates having their edges secured, preferably by welding, to the inner walls of the side plates. In the present instance, a first pair of spacer plates 41, 42 are arranged along the left hand edge of the column section while a second pair, indicated at 43, 44 are arranged along the right hand edge.

In accordance with one of the aspects of the invention, the spacer plates are arranged in different planes so as to provide rigidity in all directions. More specifically, each of the spacer plates is formed of a rectangular plate of metal transversely bent near the center at a shallow, i.e. obtuse, angle thereby to define two portions, a first portion which is arranged vertically, parallel to the path of travel of the belt, and a second portion which extends inwardly of the conveyor and in the direction of approach of the buckets on the adjacent belt section. Thus, referring to the drawings, and taking the spacer plate 41 as representative, it includes a vertical portion 41a and a second portion 41b integral with one another formed by bending along a horizontal line as indicated at 41c.

It is found that spacer plates formed and mounted as described result in a number of advantages. In the first place the relative angling of the two portions, with each secured by welding along the outer edges to the side plates, provides a high degree of rigidity in all planes. Relatively thin gage metal can be used resulting in a high strength-to-weight ratio. By spacing the spacer plates as shown, adjacent the back side of the conveyor belt, the vertical portion of each of the plates serves as a guide or stop to prevent excessive lateral flopping of the belt under certain conditions of load and tension while the angled portion, facing the direction of approach, produces a smooth leading edge minimizing chafing or wear at the back of the belt. Moreover, it will be appreciated by one skilled in the art that the spacer plate configuration provides little or no opportunity for accumulation of material which may spill from the buckets. Not only is the presented upper edge of each of the spacer plates too thin to permit accumulation, but the angularly bent portions of each of the plates is at such an angle as to shed any material which might tend to collect. In short, an angle is chosen which is steeper than the angle of repose of the material being handled.

In accordance with one of the important aspects of the invention, covers of channel shape are provided along each side of the conveyor column having parallel edges which are detachably secured to the aligned edges of the side plates to enclose the conveyor belt while permitting easy access to the interior of the conveyor whenever inspection or service are required. As shown in the drawings, each of the covers, indicated at 50, is of uniform size and shape (with the exception of the "filler pieces" at the upper and lower ends) having side portions 51, 52 and a central portion 53. Each cover is formed of a single piece of metal with large radius bends at 54, 55 respectively (see FIG. 3) with parallel flanges 56, 57 along the lateral edges. The latter are spaced to mate with the flanges formed by the vertical angles 35, 36 running along the edges of the side plates, preferably in staggered or overlapping relation. The flanges may be secured by a series of bolts indicated at 60. If desired, the number of bolts may be reduced by using longitudinal clamping members 61 embracing the flanges as shown in FIG. 10 in sections of convenient length. Or, if desired, some other disengageable means may be used for maintaining the flanges seated together, and hence effectively sealed, while permitting any one of the covers, or alternate ones of the covers, to be easily removed.

In accordance with one aspect of the present invention novel means are provided for joining the adjacent column sections so as to permit rapid and precise vertical stacking as a step in providing a permanent joint. In short, I provide, at the lower edge of each of the side plates, a transversely extending angle bar which extends below the level of the plate, together with a cooperating receiving bar, on the plate below, which provides a nest or pocket for the angle bar. Thus, referring to FIG. 8 there is shown a coupling 70 including an angle bar 71, which may be conveniently formed of angle stock, having a flat bar 72 welded thereto, to form a composite bar of triangular cross section. Arranged opposite the angle bar, on the adjacent section, is a receiving bar 75 which is welded in place at an angle which corresponds to the angled surface on the bar 71. As a result, when the sections are stacked one on another the angle bar 71 centers itself in the pocket defined by the receiving bar 75 thereby forcing the adjacent end plates into perfect alignment with one another so that the joint 76 between the plates may be conveniently welded. The abutting ends of the reinforcing angle members 35, 36 are also welded as indicated at 77. Preferably the angle members 35, 36 extend below the lower edge of the side plates so that the welded joints 76, 77 are offset from one another. If desired the angle and receiving bars may be welded together as indicated at 78. The above provides a joint having high structural strength and insures accurate mating of the side plates in spite of any localized deformation which may, for example, be caused by the welding in of the space plates. Provided that care is used in positioning the bars 71, 75, when each section is fabricated, the elevating conveyor may be assembled straight and vertical in almost any desired length.

For the purpose of sealing the adjacent edges of the covers, while permitting any one of the covers to be removed, each cover has a reinforcing band indicated at 80 overlappingly secured, for example, by spot welding, along its upper edge, each reinforcing band thus serving as a receiving pocket for the lower edge of the cover immediately above.

When it is desired to remove one of the covers, for inspection or maintenance purposes, the fastening bolts or equivalent, are removed permitting the cover to be tilted back into the position shown by the dot-dash outline in FIG. 2 enabling the upper edge to be hooked by a crane or the like so that the cover may be swung clear. While the covers add to the strength and rigidity of the overall assembly, each of the column sections has sufficient inherent strength and rigidity so that reliance need not be placed on the covers for physical strength. Thus any one of the covers and particularly alternate ones, may be removed without jeopardizing the integrity of the conveying column and without incurring any risk of bending or failure by "column action."

In the case of conveyors of conventional type, consisting of superimposed box-like elements, access is relatively difficult and the first indication that the user has of internal rusting or corrosion is when holes begin to appear in the outside wall. By this time it is usually too late to save the situation by cleaning the application of a suitable protection coating. However, when using the present construction it is a simple matter to remove one or more of the covers as often as desired as part of a regular inspection program. If any rusting is noted, the area may be brushed clean and a protective coating may be applied so that an elevating conveyor of the present design may be counted upon to last almost indefinitely. Moreover, it is to be noted that the smooth rounded interior and the special "shedding" construction of the spacer plates reduces the opportunity for material to collect which may, as in the case of damp sand, result in aggravated corrosion.

Because of the inherently high strength-to-weight ratio of the disclosed construction, the column sections serve as "building blocks" and may be permanently welded to extend the structure to almost any desired height. Where only a temporary construction is desired, reliance may be placed on the angle bar couplings between the sections supplemented by tack welding. When it is desired to change the length of the conveyor or to move it to a new location, it is a simple matter to chip out the tack welds for rapid disassembly.

I claim as my invention:

1. In an elevating conveyor, the combination comprising a plurality of column sections, each of the column sections including a pair of rectangular side plates spaced parallel to one another and joined by spacer plates having their edges secured to the inner walls of the side plates, interengaging means on the upper and lower edges of the side plates forming joints for registering the sections in stacked relation end to end with the lateral edges of the plates in continuous alinement, pulleys at the upper and lower ends of the stack, an endles conveyor belt trained about the pulleys and having buckets spaced thereon, covers of channel shape having corners of large radius terminating in parallel flanges spaced for mating with the lateral edges of the side plates, and means for detachably securing the flanges to the lateral edges of the side plates with the covers overlapping the joints between the adjacent column sections.

2. In an elevating conveyor, the combination comprising a plurality of column sections, each of the column sections including a pair of rectangular side plates spaced parallel to one another and joined by spacer plates having their edges secured to the inner walls of the side plates and arranged in different planes to provide structural rigidity in the section, means for joining the sections in stacked relation end to end with the lateral edges of the plates in alinement, pulleys at the upper and lower ends of the stack, an endless conveyor belt having buckets spaced thereon trained about the pulleys, and channel-shaped covers having parallel edges with means for detachably securing the same to the edges of the side plates and end to end for enclosing the buckets.

3. In an elevating conveyor, the combination comprising a plurality of column sections, each of the column sections including a pair of rectangular side plates spaced parallel to one another and joined by spacer plates having their edges secured to the inner walls of the side plates to form a rigid section, means for joining the sections in stacked relation end to end with the lateral edges of the plates in alinement, pulleys at the upper and lower ends of the stack, an endless conveyor belt having buckets spaced thereon trained about the pulleys, channel-shaped covers having parallel edges with means for detachably securing the same to the edges of the side plates for enclosing the buckets, each of said spacer plates having a vertical section and a section at an obtuse angle with respect thereto to provide rigidity in all directions while shedding any bulk material which may be dislodged from the buckets.

4. In an elevating conveyor, the combination comprising a plurality of column sections, each of the column sections including a pair of rectangular side plates spaced parallel to one another and joined by spacer plates having their opposite edges secured to the inner walls of the side plates, means for joining the sections in stacked relation end to end with the lateral edges of the plates in continuous alinement, pulleys at the upper and lower ends of the stack, an endless flexible conveyor belt trained about the pulleys and having buckets spaced along its outer surface, channel-shaped covers having parallel edges with means for detachably securing the same end to end to the edges of the side plates for enclosing the buckets while providing access into the central portion of the conveyor, said spacer plates including vertical portions spaced closely adjacent the conveyor belt and including portions extending laterally inward in the direction of approach of the buckets for rigidification of the sections and for providing an internal bumper to prevent any excessive lateral flopping movement of the belt.

5. In an elevating conveyor, the combination comprising a plurality of column sections, each of the column sections including a pair of rectangular side plates spaced parallel to one another and joined by spacer members having their edges secured to the inner walls of the side plates, means for joining the sections in stacked relation end to end with the lateral edges of the plates in continuous alinement, pulleys at the upper and lower ends of the stack, an endless conveyor belt trained about the pulleys and having buckets spaced thereon, cover plates having parallel edges with means for detachably securing such edges to alined edges of the side plates for enclosing the buckets while providing access thereto upon release of the securing means, the buckets being arranged on said belt in two vertical rows and in slightly overlapping relation so that any spillage out of the adjacent ends of the buckets is caught by buckets lower on the belt, said cover plates being in the form of rounded channels so that any spillage out of the opposite ends of the buckets may fall freely along the rounded surfaces free of any tendency to pocket in the course of downward travel.

6. In an elevating conveyor, the combination comprising a plurality of column sections, each of the column sections including a pair of rectangular side plates spaced parallel to one another and having their facing surfaces joined by transversely extending spacer members, angle bars secured horizontally to the outside surfaces of the respective side plates along the lower edges thereof, and cooperating receiving bars secured to the outside surfaces of the respective side plates along the upper edges thereof to form a pocket for nested engagement of the angle bars of the adjacent superimposed column section to enable formation of a stack of column sections with the side plates in continuous registered alinement, pulleys at the upper and lower ends of the stack, an endless conveyor belt trained about the pulleys and having buckets spaced thereon, and a plurality of channel-shaped covers having parallel edges with means for detachably securing the same end to end along the edges of the side plates for enclosing the buckets while providing access to the center of the conveyor for inspection and maintenance.

7. In an elevating conveyor, the combination comprising a plurality of column sections, each of the sections including a pair of rectangular side plates spaced parallel to one another and having their facing surfaces joined by transversely extending spacer members, reinforcing angle members extending along the lateral edges of the side plates and forming a flange extending in right angles to the plane of the side plates, interengaging means on the upper and lower edges of adjacent side plates forming joints for registering the side plates of successive sections and the angle members thereon in continuous alinement, pulleys at the upper and lower ends of the stacks, an endless conveyor belt trained about the pulleys and having buckets spaced thereon, and a plurality of cover sections of a rounded channel shape each having a pair of outwardly teamed flanges for mating with the flanges on the side plates together with means for detachably securing the flanges together with the covers positioned end to end to enable the removal of any desired portion of the covers for inspection and maintenance of the internal surfaces of the column sections and covers.

References Cited by the Examiner
UNITED STATES PATENTS

| | | | |
|---|---|---|---|
| 1,525,363 | 2/1925 | Boyce | 198—208 |
| 3,015,382 | 1/1962 | Kaufmann | 198—206 |

EVON C. BLUNK, *Primary Examiner.*

A. C. HODGSON, *Assistant Examiner.*